United States Patent [19]

Boyé et al.

[11] Patent Number: 5,162,148
[45] Date of Patent: Nov. 10, 1992

[54] MATERIAL FOR MANUFACTURING PROTECTIVE EQUIPMENT AGAINST NUCLEAR, BIOLOGICAL AND CHEMICAL ATTACKS

[75] Inventors: Philippe Boyé, Sete; Daniel Hervet, Arras, both of France

[73] Assignees: Soplaril SA, Arras; Manufacture de Vetements Paul Boye SA, Sete, both of France

[21] Appl. No.: 631,918

[22] Filed: Dec. 21, 1990

[30] Foreign Application Priority Data

Dec. 22, 1989 [FR] France ................. 89 17065

[51] Int. Cl.$^5$ .......... B32B 27/36; D04H 1/58
[52] U.S. Cl. ........... 428/287; 428/284; 428/286; 428/216; 428/288; 428/483; 428/516
[58] Field of Search ............ 428/284, 286, 287, 288

[56] References Cited

U.S. PATENT DOCUMENTS 4,595,629  6/1986  Mays ................. 428/286
4,687,692  8/1987  Akao ................. 428/286

*Primary Examiner*—George F. Lesmes
*Assistant Examiner*—Kathryne E. Shelborne

[57] ABSTRACT

A material for manufacturing protective equipment against nuclear, biological and chemical attacks, including
a non-woven polyolefin substrate
an outer layer made of a polyolefin film,
an intermediate layer of a protective material selected in the group comprising ethylene-hydrolyzed vinyl acetate (with 20–40% ethylene) copolymer (EVOH) and polyethylene terephtalate coated with polyvinylidene chloride,
the different layers being binded together by using suitable binders.

This material is appropriate for manufacturing pieces of clothing, tents, sheets, sleeves, and so on, in a protective purpose.

7 Claims, 1 Drawing Sheet

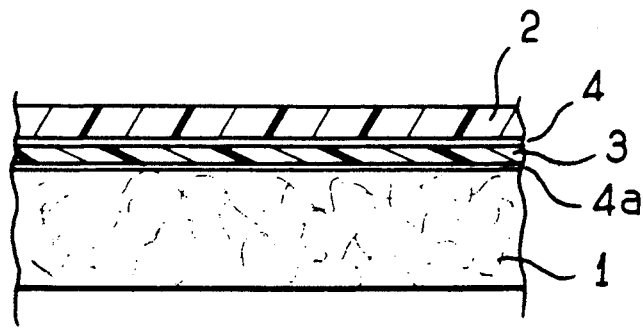
FIG_1
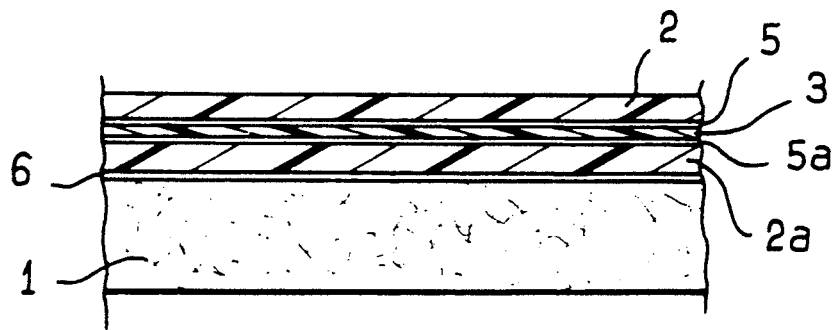
FIG_2
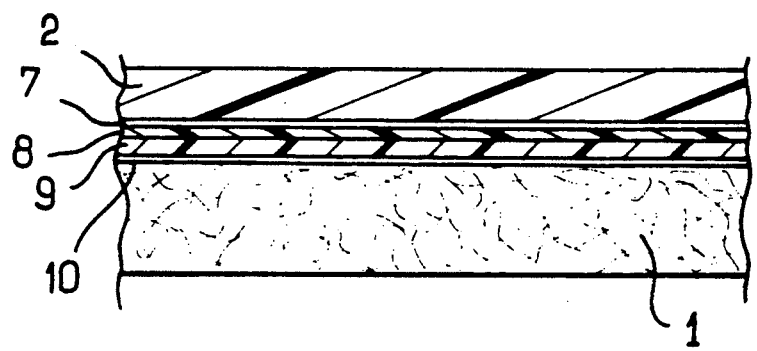
FIG_3

MATERIAL FOR MANUFACTURING PROTECTIVE EQUIPMENT AGAINST NUCLEAR, BIOLOGICAL AND CHEMICAL ATTACKS

The invention relates to a material for manufacturing protective equipment, namely clothing, tents, sheets, sleeves, and the like, against nuclear, biological and chemical (NBC) attacks.

Materials used in this purpose comprise several layers of different coextruded or laminated plastics, associated to various agents active against particularly biological and chemical attacks. So are known materials having an outer layer of elastomer kind (butyl rubber, neoprene, polyurethane), an active inner layer (activated carbon against biological and nuclear attacks for example, lead against irradiation) and a cotton or polyamide (Nylon for instance) substrate. In order that equipment manufactured from this material be wholly tight, binding together various parts is made through seaming and welding, or directly through welding.

It would be advantageous to take advantages of the good weldability of polyolefins (polyethylene for instance), such plastics further having a good chemical resistance and a good strength but products obtained until now with polyolefins (for example polyethylene) have not been fully satisfactory.

It has now surprisingly been found that upon introducing between a substrate of non-woven polyolefin (polyethylene, polypropylene, and the like) and an outer layer made of a polyolefin (for example polyethylene) film, a layer of a protective material selected in the group comprising EVOH (hydrolyzed vinyl acetate-/ethylene copolymer; with hydrolyzed vinyl acetate being polyvinyl alcohol containing 20 to 40% ethylene) and polyethylene terephthalate coated with polyvinylidene chloride, a material having excellent properties of NBC protection is obtained.

The invention provides thus such a material including
a substrate made of a polyolefin non-woven fabric
an outer layer made of a polyolefin film,
an intermediate layer of a protective material selected in the group comprising EVOH and polyethylene terephthalate coated with polyvinylidene chloride,
the various layers being binded together by means of appropriate binders.

In the present disclosure, the term "outer layer" means the layer to be exposed to the NBC attacks.

FIG. 1 is an enlarged cross-sectional view of a material according to the invention.

FIG. 2 is an enlarged cross-sectional view of an embodiment of the invention, and FIG. 3 is an enlarged cross-sectional view of another embodiment of the invention.

Referring to FIG. 1 a material of the invention includes a non-woven polyolefin substrate 1, an outer layer made of a polyolefin film 2 and an intermediate layer 3 of a protective material, with layers 4,4a of appropriate adhesives.

This intermediate layer 3 may be in turn a multi-layer as shown in FIG. 2 and 3 corresponding to examples 1 and 2 respectively.

As an example of polyolefin for both the non-woven substrate 1 and the outer layer 2, polyethylene and polypropylene may be cited.

When the intermediate layer 3 of protective material is made of EVOH, it is at least 6 μm thick and up to 12 μm. A value lower than 6 μm does not provide suitable protective properties and a value higher than 12 μm is not economically interesting. EVOH with 30% ethylene is preferably used.

In the case of an intermediate protective layer made of polyethylene terephthalate coated with polyvinylidene chloride (PVDC), it is used a PET film at least 12 μm thick on which a PVDC layer at least 3 μm thick is coated. The PET film is preferably made of bistretched PET.

The polyolefin non-woven substrate 1 may have a weight of 10 to 150 g/m$^2$. It is essentially used for forming a flexible carrier having strength enough to withstand steps of laminating supplemental layers and stress upon duty. It also allows to provide the assembly with wished optical features (color and so on). Polyolefin non-woven fabrics are commercially available, for instance those sold under the name TYVEK ® (E. I. Dupont de Nemours), particularly grade TYVEK 1422 R.

The outer polyolefin film 2 has a thickness ranging from 20 to 100 μm and preferably from 60 to 90 μm, as higher values do not improve protective properties and too much increase the weight of the finished material. The latter one, namely when used for manufacturing pieces of clothing, should be kept enough flexible and light so that the user is able of almost free gesture.

It has been found that whereas the EVOH layer well adheres to the polyolefin layer with usual adhesives 5 (or binders), a suitable adhesion of the EVOH layer to the polyolefin non-woven fabric is more difficult to obtain. A solution as shown in FIG. 2 consists in introducing between the EVOH layer 3 and the non-woven fabric 1 a polyolefin (polyethylene or polypropylene for instance) film 2a binded to the EVOH layer by means of an adhesive 5a similar to the one used above. The second polyolefin layer 2a may have a very small thickness (about 10 μm) as its main function is a binding function but it may be advantageous to divide the polyolefin (polyethylene (PE) for instance) amount into two equal or substantially equal layers. In such a case, the unit PE film/binder/EVOH layer/binder/PE film may be obtained by co-extrusion with a control of thicknesses being obtained as usual. This unit is then laminated on the non-woven polyolefin with a binder layer 6.

Such a construction may also be obtained through laminating discrete films coated with usual binders on the appropriate faces.

When polyethylene terephthalate (PET) coated with PVCD is used as the protective intermediate layer as shown in FIG. 3, the product is advantageously obtained by laminating the differents films, the PET film being previously coated with a PVDC coating of the desired thickness on the face which comes in contact with the PE film.

EXAMPLE 1

A five-layer coextrudate is prepared through coextrusion and comprises
a polyethylene film 2 of about 32 μm
a binder layer 5 of 5-6 μm
an EVOH layer 3 of 6 μm (minimum thickness)
a binder layer 5a of 5-6 μm
a polyethylene film 2a of about 32 μm.

Once prepared, this unit is laminated onto non-woven polyethylene 1 (TYVEK ® 1422 R) with using 3 g/m$^2$ of a suitable adhesive 6. The obtained material has a weight of 120 g/m$^2$ and allows a period of protection higher than 24 hours against a contamination of 10 g/m² of concentrated strong chemical products (acids, bases, . . . ) and of warfare gas such as mustard gas or the organophosphorus ones.

EXAMPLE 2

On a polyethylene film 2 80 μm thick, a binder (adhesive) layer 7 is deposited in an amount of 3 g/m² then a bistretched PET film 9 12 μm thick coated with a PVDC layer 8 3 μm thick on the face facing the polyethylene film is laminated thereto. The unit so obtained is laminated (with 3 g/m² of binder 10) on a non-woven polyethylene 1 (TYVEK ® 1422 R). The final material has a weight of 150 g/m² and gives a period of protection higher than 24 h against a contamination of 10 g/m² of concentrated strong chemical products (acids, bases, . . . ) and of gas such as mustard gas or the organophosphores ones.

Of course the invention is not limited to thicknesses and weights given in the examples, except to the minimum values of the thickness of the intermediate protective layer, and these thicknesses may be changed and are only illustrative.

The fact that both faces (outer layer and non-woven layer) of the finished material are made of polyolefin, and generally of the same polyolefin, a feature of which is a good weldability on itself, allows to obtain all kinds of welds:

outer face/outer face, inner face/inner face and outer face/inner face, this being particularly advantageous in manufacturing pieces of clothing.

We claim:

1. A material for manufacturing protective equipment against nuclear, biological and chemical attacks, comprising a non-woven polyolefin substrate
an outer layer made of a polyolefin film,
an intermediate layer of a protective material selected from the group consisting of ethylene-hydrolyzed vinyl acetate with 20–40% ethylene copolymer and polyethylene terephtalate coated with polyvinylidene chloride, wherein said intermediate layer has a thickness of at least 6 μm the different layers being binded together by using binders.

2. A material as claimed in claim 1, characterized in that it comprises
a) a layer of a polyolefin film having a thickness of 20 to 100 μm,
b) a layer of a binder,
c) an EVOH layer having a thickness of at least 6 μm,
d) a layer of a binder,
e) a layer of polyolefin film having a thickness of 20 to 100 μm,
f) a polyolefin non-woven substrate.

3. A material as claimed in claim 2, wherein the polyolefin films and the non-woven substrate are made of polyethylene.

4. A material as claimed in claim 2, which is obtained through co-extrusion of layers a to e and lamination of the obtained unit to the substrate f.

5. A material as claimed in claim 4, wherein the polyolefin films and the non-woven substrate are made of polyethylene.

6. A material as claimed in claim 1, wherein said intermediate layer of protective material consists of a polyethylene terephthalate film having a thickness of at least 12 μm with a polyvinylidene chloride layer of at least 3 μm thick.

7. A material according to claim 5, which is obtained by laminating the three layers in the presence of binders between the layers.

* * * * *